United States Patent [19]
Hoffman et al.

[11] Patent Number: 5,905,666
[45] Date of Patent: May 18, 1999

[54] PROCESSING SYSTEM AND METHOD FOR PERFORMING SPARSE MATRIX MULTIPLICATION BY REORDERING VECTOR BLOCKS

[75] Inventors: Alan Jerome Hoffman, Greenwich, Conn.; William Robert Pulleyblank, Cronton-on-Hudson, N.Y.; John Anthony Tomlin, Sunnyvale, Calif.

[73] Assignee: International Business Machines Corporation, Armonk, N.Y.

[21] Appl. No.: 08/931,901

[22] Filed: Aug. 28, 1997

Related U.S. Application Data

[63] Continuation of application No. 08/367,627, Jan. 3, 1995, abandoned.

[51] Int. Cl.$^6$ .............................. G06F 7/52; G06F 19/00
[52] U.S. Cl. .............................. 364/754.02; 364/468.05; 364/736.03; 364/841; 395/674; 705/8
[58] Field of Search .................... 364/754.01, 754.02, 364/736.03, 468.05, 807, 822, 837, 841, 845; 395/674; 705/8

[56] References Cited

U.S. PATENT DOCUMENTS

| | | | |
|---|---|---|---|
| 4,787,057 | 11/1988 | Hammond | 364/754.02 |
| 4,823,299 | 4/1989 | Chang et al. | 364/735 |
| 4,885,686 | 12/1989 | Vanderbei | 364/468.05 |
| 4,914,615 | 4/1990 | Karmarkar et al. | 364/754.02 |
| 4,918,639 | 4/1990 | Schwarz et al. | 364/757 |
| 5,021,987 | 6/1991 | Chan et al. | 364/754.02 |
| 5,025,407 | 6/1991 | Gulley et al. | 364/748.2 |
| 5,107,452 | 4/1992 | Karmarkar et al. | 364/754.02 |
| 5,170,370 | 12/1992 | Lee et al. | 364/736.03 |
| 5,185,715 | 2/1993 | Zikan et al. | 364/807 |
| 5,408,663 | 4/1995 | Miller | 395/674 |

FOREIGN PATENT DOCUMENTS

| | | |
|---|---|---|
| 4037032A1 | 11/1990 | Germany . |
| 2272867 | 4/1989 | Japan . |

OTHER PUBLICATIONS

Kugel, Triple Multiplication of Sparse Matrices Technique, IBM Tech. Disclosure Bulletin, Y08710152, vol. 15, No. 2, pp. 376–377, Jul. 1972.

Gustavson, Efficient Algorithm to Perform Sparse Matrix Multiplication, IBM Tech. Disclosure Bulletin, Y08760479, vol. 20, No. 3, pp. 1262–1264, Aug. 1977.

Gustavson, Inverse of a Triangular Matrix Efficient Determination of the Boolean, IBM Tech. Disclosure Bulletin, vol. 23, No. 6, pp. 2614–2617, Nov. 1980.

Li and Sheng, Sparse Matrix Vector Multiplication of Polymorphic–Torus, IBM Tech. Disclosure Bulletin, vol. 32, No. 3A, Y08880066, pp. 233–238.

(List continued on next page.)

*Primary Examiner*—Emmanuel L. Moise
*Attorney, Agent, or Firm*—James C. Pintner

[57] ABSTRACT

A method, system, and data structure are provided which facilitate matrix multiplication with advantageous computational efficiency. The invention, as variously implemented as a processing system, method, or data structure in a recording medium such as a memory, has applicability to numerous fields, including linear programming, where a great deal of multiplication of large, sparse matrices is performed. The method of the invention includes the steps of creating a first submatrix block from non-zero terms of a sparse matrix, such that all of the terms within a given column of the submatrix block are form a respective column of the sparse matrix, creating a corresponding second index submatrix block of the same dimensions as the first block, such that each term of the second block identifies the position of the corresponding term of the first block within the sparse matrix, in terms of a row and column index. Finally, the method includes reordering terms of the first and second blocks correspondingly, as necessary to produce a final configuration within the first and second blocks such that all of the row indices within any given row of the second block are distinct.

12 Claims, 7 Drawing Sheets

OTHER PUBLICATIONS

Melhem, Parallel Solution of Linear Systems with Striped Sparse Matrices, Parallel Computing 6, pp. 165–184, 1988.

Andersen, Mitra and Parkinson, The Scheduling of Aparse Matrix–Vector Multiplication on a Massively Parallel DAP Computer, Parallel Computing 18, pp. 675–697, 1992.

Li and Sheng, Sparse Matrix Multiplicaton of Polymorphic–Torus, Proc. 2nd Symposium on the Frontiers of Massively Parallel Computation, pp. 181–186, Oct. 1988.

Gotze and Schwiegelshohn, Sparse Matrix–Vector Multiplication on a Systolic Array, Int. Conf. Acoustics, Speeth& Signal Processing V4, 1988, pp. 2061–1064.

Forrest and Tomlin, Vector Processing in Simplex and Interior Methods for Linear Programming, Presented at the Workshop on Supercomputers and Large–Scale Optimization Univ. of Minn., May 1988.

Forrest and Tomlin, Implementing Interior Point Linear Programming Methods in the Optimization Subroutine Library, IBM Systems Journal, vol. 31, No. 1, 1992.

Forrest and Tomlin, Implementing the Simplex Method for the Optimization Subroutine Library, IBM Systems Journal, vol. 31, No. 1, 1992.

DuCroz and Higham, Stability of Methods for Matrix Inversion, IMA Journal of Numerical Analysis 12, pp. 1–19, 1992.

Morjaria and Makinson, Unstructured Sparse Matrix Vector Multiplicaton on the DAP, Proceedings Progress in the Use of Vector & Array Processors, Institute of Mathematics and its Applications, Sep. 2–3, 1982.

Coefficient Table (the A matrix)

| 0 | 1 | 0 | 3 | 0 | 0 | 1 | 0 | 0 | 0 |
|---|---|---|---|---|---|---|---|---|---|
| 0 | 0 | 3 | 0 | 4 | 6 | 0 | 0 | 0 | 0 |
| 1 | 0 | 0 | 0 | 0 | 0 | 0 | 2 | 0 | 1 |
| 0 | 0 | 4 | 0 | 3 | 0 | 0 | 0 | 0 | 0 |
| 0 | 0 | 1 | 0 | 0 | 0 | 0 | 5 | 1 | 0 |
| 6 | 0 | 0 | 0 | 2 | 0 | 0 | 0 | 0 | 2 |
| 0 | 1 | 0 | 0 | 0 | 1 | 2 | 0 | 0 | 0 |
| 5 | 0 | 0 | 0 | 0 | 0 | 0 | 3 | 0 | 0 |
| 4 | 0 | 0 | 0 | 0 | 2 | 0 | 0 | 0 | 0 |
| 0 | 1 | 2 | 3 | 6 | 5 | 6 | 7 | 8 | 9 |

*FIG. 1*

Non-Zero Terms from Columns 1,3,5,6, and 8 of the A Matrix $$
\begin{array}{ccccc}
1 & 3 & 4 & 6 & 2 \\
6 & 4 & 3 & 1 & 5 \\
5 & 1 & 2 & 2 & 3 \\
4 & 2 & 6 & 5 & 7
\end{array}
$$

FIG. 2

Row and Column Indices for the Non-Zero Terms in FIG. 2

$$
\begin{array}{ccccc}
i_{3,1} & i_{2,3} & i_{2,5} & i_{2,6} & i_{3,8} \\
i_{6,1} & i_{4,3} & i_{4,5} & i_{7,6} & i_{5,8} \\
i_{8,1} & i_{5,3} & i_{6,5} & i_{9,6} & i_{8,8} \\
i_{9,1} & i_{10,3} & i_{10,5} & i_{10,6} & i_{10,8}
\end{array}
$$

| 1 | 3 | 3 | 6 | 2 |
| 6 | 4 | 4 | 1 | 5 |
| 5 | 1 | 2 | 2 | 3 |
| 4 | 2 | 6 | 5 | 7 |

| 1 | 2 | 3 | 6 | 2 |
|---|---|---|---|---|
| 6 | 4 | 4 | 1 | 5 |
| 5 | 1 | 2 | 2 | 3 |
| 4 | 3 | 6 | 5 | 7 |

FIG. 10

PROCESSING SYSTEM AND METHOD FOR PERFORMING SPARSE MATRIX MULTIPLICATION BY REORDERING VECTOR BLOCKS

This is a continuation of application Ser. No. 08/367,627 filed on Jan. 3, 1995 now abandoned.

TECHNICAL FIELD

The present invention is generally related to the field of matrix processing. More specifically, the invention relates to a system and method for performing matrix multiplication in a manner more computationally efficient than has been done heretofore, the method having particularly advantageous applicability to solving linear programming problems.

BACKGROUND OF THE INVENTION

As an introduction to the types of issues which arise in the application of processing systems to matrix processing, a discussion of linear programming will be given, including a discussion of what techniques are used for solving linear programming problems and of what role matrix processing plays in those techniques. From this discussion, it will be evident how the method of the invention is applicable to improve matrix processing performance.

The field of linear programming came into existence in the years following World War II, in which various types of logistical problems, many extremely complex and involving up to thousands of variables, needed to be solved as cost-efficiently as possible.

A typical problem might be one of supplying various types of goods from a number of distribution sites to a number of destinations. Each destination has certain requirements regarding how many of each type of goods it needs to have on hand. For a given type of goods at a given location, a certain cost per unit shipped is associated with each distribution point. Generally, the cost is related to the distance between the distribution point and the destination, or the mode of transportation which must be used in shipping the goods. Also, there may be constraints on the quantity of goods shipped. For instance, a given distribution site might have a limited quantity of a certain type of goods on hand. Thus, a nearby destination having a greater demand for those goods is required to ship some of its requirements from a more distant, more costly, distribution site. Also, since linear programming problems often arise out of "real-world" situations, zero is often a lower bound on the value of a variable. That is, the quantity of goods shipped from a given source to a given destination will likely have zero as a realistic lower bound.

The problem, then, is to find values for the quantities of each type of goods shipped from each distribution point to each destination, such that the total cost required for all the shipments is minimized, but all of the destinations are supplied with their requirements of all types of goods. This problem, as with essentially all linear programming problems, is expressed mathematically in the following general form:

$$\min \sum_{j=1}^{n} c_j x_j \quad (1)$$

subject to:

$$Ax=b \quad (2)$$

where $$L_j \leq x_j \leq U_j \quad (3)$$

That is, find a vector of x values such that the sum of products of the x values and a set of coefficients is minimized, given a set of constraints on the x values.

The first of these three expressions may be through of as a cost function. In the example given above, the variables $x_j$ represent the quantities of goods shipped, and the variables $c_j$ represent the costs per unit associated with shipping the goods. Thus, each term of the sum is a total cost for shipping one type of goods from one distribution point to one destination. The sum of all such terms is the grand total cost for all shipments. It will be seen, then, that minimizing this grand total cost of all such shipments is the basic objective of a linear programming problem.

The constraint Ax=b defines the "ground rules" for the linear programming problem under which the cost is to be minimized. In this expression, b is a vector of constants, in which each constant is the total quantity of one of the types of goods required by the destination. The A matrix and the b vector represent information such as the requirements of each location for each type of goods, etc. Note that Ax=b may also be a set of inequalities, such as Ax≦b, etc.

Finally, the last expression represents constraints, if any, on the quantities of goods shipped from a given distribution point. In many linear programming problems, the lower bound $L_j$ is zero. As described above, the upper bound $U_j$ is a constraint, which may limit the maximum value for the quantity of a given type of goods shipped from a given location, if that is all there is on hand at that location.

Ax=b represents a system of linear equations, where x is a vector of variables, and A is a two-dimensional array of coefficients. Since A, x, and b are vectors or matrices, it will be seen that the expression Ax=b is s matrix multiplication problem. It will thus be seen that matrix processing capability is fundamental to solving linear programming problems.

In practice, the coefficient matrix A is usually sparse. A matrix is said to be "sparse" if a large portion of its terms are zero.

Given a system of n equations in n variables, it is possible to solve the system of equations to obtain unique values for the variables, if such unique values exist. However, in most realistic linear programming problems, the number of variables greatly exceeds the number of equations. Thus, there are a large number of possible solutions to such a system of equations. Because of this, it is possible to attempt to find one of the possible solutions which minimizes the total cost.

If the variables $x_j$ are visualized as defining an n-dimensional solution space for the linear programming problem, then the range of possible solutions can be represented as an n-dimensional polyhedron within that solution space. Because the equations defined by Ax=b are linear, the faces of the solution polyhedron are planar. Faces of the solution polyhedron are defined by the limiting values of various ones of the variables $x_j$. It can be proven that the minimum cost is given by a solution represented by one of the vertices of the polyhedron.

The concept of a solution polyhedron in a solution space is a key to conceptualizing the different strategies for solving linear programming problems, which will now be presented.

The Simplex Method

The classic text by Dantzig, "Linear Programming and Extensions," Princeton University Press, Princeton, N.J. (1963), teaches a method, called the "simplex method", for solving a linear programming problem, i.e., finding values for the vector of x variables such that the cost is minimized. In the simplex method, a solution represented by one of the vertices of the solution polyhedron is selected, more or less at random. Then, moves are made in a sequence from one vertex to another, each move decreasing the total cost, until finally a vertex is reached from which no additional movement can reduce the cost any further. This final vertex is the solution to the linear programming problem.

The simplex method is executed as follows: A group of variables equal to the number of equations are selected, more or less at random, and are designated "basic variables." The remaining variables are called "nonbasic" or "independent" variables. The independent variables are set to feasible values, i.e., values within the range defined by the upper and lower limits given in the above expression. Since the lower limit $L_j$ is often 0, feasibility generally means that the variables have nonnegative values.

Using algebraic techniques similar to those used in solving n equations in n variables, i.e., adding linear combinations of the equations, the system of linear equations is placed into "canonical form," in which each equation has a coefficient 1 for one of the basic variables, and coefficients 0 for all the other basic variables. Thus, placing the equations in canonical form is equivalent to solving for the basic variables. This solution, if it is feasible, represents one of the vertices of the solution polyhedron.

Next, a better solution is sought as follows: The value of one of the independent variables is varied. Varying the value of the independent variable has the effect of changing the values of other variables. If varying the independent variable reduces the total cost, that independent variable is varied in value until one of the basic variables reaches a limiting value, such as zero. That basic variable is now replaced by the independent variable whose value had been changed. The values for the resulting new set of basic variables define another vertex of the solution polyhedron, connected to the first vertex by an edge. Varying the value of the independent variable had the effect of moving along an edge of the solution polyhedron which runs from the first vertex to the new vertex.

The process just described is repeated, moving from vertex to vertex, until no further change to any of the independent variables results in a cost reduction. At this point, the values of the basic and independent variables define the optimal solution to the linear programming problem, and the simplex method has been completed.

Since there are often on the order of thousands of variables in a realistic linear programming problem, solutions are typically calculated on computers. Because of the large numbers of calculations involved in matrix algebra, and the large number of iterations required for a technique such as the simplex method, computational efficiency is an important objective in a computer-implemented linear programming solver.

In particular, an implementation of the simplex method involves certain specific types of matrix calculations. First, in the expression $Ax=b$, $Ax$ is broken up into two terms, i.e., two matrix products, representing basic variables $x_b$ and independent variables $x_n$, as follows:

$$Ax = Bx_b + Nx_n = b \qquad (4)$$

This expression is then solved for $x_b$ as follows:

$$x_b = B^{-1}b - B^{-1}Nx_n \qquad (5)$$

The cost z associated with the selected values for the variables is given by $$z = c^T_B x_B + c^T_N x_N \qquad (6)$$

It is necessary to use the matrix transposes $c^T_b$ and $c^T_n$ of the basic and independent portions of the cost coefficient matrix for these matrix multiplication expressions to be in proper form. Therefore, a cost differential $d_j$ which is associated with changing the value of one of the independent variables associated with the j-th column of the N matrix is given by the expression $$d_j = c_j - c^T_B B^{-1} a_j \qquad (7)$$

where $c_j$ is the cost, absent the change of value of the independent variable, $a_j$ is the j-th column of N, and $B^{-1}$ is the inverse matrix of B. For a change of value of an independent variable to produce an overall reduction in cost, $d_j$ should have a value less than zero.

The above expression is calculated many times during the course of solving a linear programming problem. Therefore, the matrix product $c^T_B B^{-1}$, which is a one-dimensional vector, is designated as $\pi^T$, and referred to as the "shadow prices" or "pi values." During the course of the simplex method, the matrix product $\pi^T A$, or $\pi^T a_j$ for individual columns of the matrix A, is calculated many times. The expression $\pi^T A$ is referred to as "multiplication on the left," referring to the position of the matrix $\pi^T$ to be multiplied with the coefficient matrix A. This calculation is made for every iteration of the simplex method, to determine whether the change in value of an independent variable is reducing the total cost. For these calculations, which may number in the thousands, A remains constant, but the pi values change as different variables are swapped in and out of the set of basic variables.

A different matrix calculation is made, following each iteration, to check for the feasibility of the solution. The vector of solutions x is multiplied by the coefficient matrix, to evaluate $Ax=b$. This is referred to as "multiplication on the right," again referring to the position of the vector to be multiplied with the coefficient matrix A. In the simplex method, multiplication on the right is executed much less frequently than multiplication on the left. Accordingly, in vector processing implementations of linear programming software, optimization for multiplication on the left has produced good computational efficiency for the simplex method. While this optimization decreases the efficiency of multiplication on the right, overall computational efficiency is not greatly reduced, since multiplication on the right is performed relatively infrequently.

Interior Point Methods

More recently, alternative methods for solving linear programming problems have been explored. These other methods have been referred to as "interior point" methods, because they can be characterized as moving through the interior of the solution polyhedron. This is in contrast with the simplex method, in which motion is only along the outer edges of the solution polyhedron.

Several different interior point methods are discussed in detail in Forrest and Tomlin, "Implementing Interior Point Linear Programming Methods in the Optimization Subroutine Library," IBM Systems Journal, Vol. 31, No. 1, 1992. One class of interior point methods, for instance, is called barrier methods. In a barrier method, non-linearities are introduced which prevent the limits from being violated. Then, calculus-based methods are used for the minimization. For example, in a logarithmic barrier method, the problem is to find values for the variables $x_j$ which minimize $$\min \sum_{j=1}^{n} (c_j x_j - \mu \ln(x_j - L_j) - \mu \ln(U_j - x_j)) \quad (8)$$

subject to:

$$Ax = b \quad (9)$$

where $$L_j \leq x_j \leq U_j \quad (10)$$

In the above expressions, $\mu \rightarrow 0$ and $\mu > 0$. Because $\mu$ is positive, the logarithm terms become large as the variable approaches the limit. However, since $\mu$ tends toward zero, the logarithm terms are small, and do not greatly change the result from what it would be if only the cost terms were summed. Since the logarithmic terms of the sum are not defined for values outside the upper and lower limiting values, the bounds cannot be violated.

In essence, solving such a problem involves taking a series of steps from an initially selected solution, each step having a given step length, and each step being taken in a direction, through the solution polyhedron, of reduced cost. The major computational burden of each step of the interior point method is a gradient projection, which is solved as a least-squares problem. The solution of the least-squares problem is a vector change. For the least-squares solution, pi values and reduced costs are updated in a manner similar to that described in connection with the simplex method.

In particular, the least-squares calculation involves multiplication on the right. The matrix product Ax is computed a much greater number of times in interior point methods than in the simplex method.

Considerations that Affect Computational Efficiency

From the foregoing, it will be seen that, whether the simplex method or an interior point method is used to solve a linear programming problem, there will be a great many matrix multiplications involving the coefficient matrix A. Matrix multiplication is generally implemented on a processor having vector processing capability as vector multiplication of rows and/or columns. Multiplications both on the left and on the right are used. Frequently, the A matrix is sparse, i.e., a large number of the terms of the A matrix have the value zero. Thus, computational efficiency is improved by reducing the number of multiplications involving zero terms.

In Forrest and Tomlin, "Vector Processing in Simplex and Interior Methods for Linear Programming", 22 Annals of Operations Research 71-100 (1990)[2], a method is employed for storing coefficients in computer memory for convenient access and efficient execution of multiplication on the left. Columns of the A matrix having large numbers of non-zero terms are stored separately for vectorization. Columns having relatively few non-zero terms are stored in blocks. A second block of memory contains indices, each index corresponding with one of the non-zero terms stored in the block, and indicating which position in the column of the A matrix the term occupied. The cost reduction is then calculated, using a vector processor, by reading a vector of indices from the second block, obtaining a vector of pi values, selecting each pi value for the vector based on the value of the corresponding index. Finally, the scalar product of the pi value vector and the corresponding row of the first block is added to a cost reduction value. This process is repeated for each row of the first block. Because this method involves multiplying rows of the A matrix terms, computational efficiency is achieved by storing the terms in memory row-wise.

Since the most frequently executed matrix multiplication in the simplex method is that on the left, the above data structure works well. However, since the advent of interior point methods, it has been common practice to follow interior point optimization by iterations of the simplex (or a simplex-like) method. For the newer interior point methods, where multiplication on the right (Ax) takes place more frequently, the above data structure is not well suited. Therefore, to accommodate the newer interior point methods, it is desirable to find a way of utilizing the above-described data structure efficiently to vectorize multiplication on the right.

SUMMARY OF THE INVENTION

It is therefore an object of the invention to provide a processing system and method which efficiently performs multiplications on the right, using data structures containing coefficients of the A matrix, stored in a manner conducive to multiplication on the left.

To achieve these and other objectives, there is provided in accordance with the invention, a method for facilitating efficient matrix processing by substantially eliminating zero-product terms. The method permits multiplication on the left, as described above, but also advantageously allows for correct multiplication on the right.

The method of the invention includes the steps of creating a first submatrix block from non-zero terms of a sparse matrix, such that all of the terms within a given column of the submatrix block are from a respective column of the sparse matrix, creating a corresponding second index submatrix block of the same dimensions as the first block, such that each term of the second block identifies the position of the corresponding term of the first block within the sparse matrix, in terms of a row and column index. Finally, the method includes reordering terms of the first and second blocks correspondingly, as necessary to produce a final configuration within the first and second blocks such that all of the row indices within any given row of the second block are distinct.

While the invention is primarily disclosed as a method, it will be understood by a person of ordinary skill in the art that an apparatus, such as a conventional data processor, such as that shown in FIG. 12, including a CPU, (central processing unit) 1202 memory 1204, I/O (input/output) 1206 program storage 1208, a connecting bus 1210, and other appropriate components, could be programmed or otherwise designed to facilitate the practice of the method of the invention. Such a processor would include appropriate program means stored in the program storage 1208, for executing the method of the invention. Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

BRIEF DESCRIPTION OF THE DRAWINGS

FIG. 1 is an example of a sparse matrix with regard to which the method of the invention is to be applied.

FIG. 2 is a matrix of non-zero terms of the matrix of FIG. 1 which is used pursuant to the method of the invention.

FIG. 3 is a matrix of indices, the matrix being equal in numbers of rows and columns to that of FIG. 2, each index having two subscripts whose values give the row and column numbers, respectively, of the positions within the matrix of FIG. 1 from which the corresponding terms of FIG. 2 are taken.

FIGS. 5 and 6 are processed portions of the matrix of indices of FIG. 3, showing the state of the matrix of indices before and after a first intermediate step of the method of the invention.

FIG. 7 is the matrix of non-zero terms from FIG. 2, as modified as of a point in time contemporaneous with FIG. 6.

FIGS. 8 and 9 are processed portions of the matrix of indices of FIG. 3, showing the state of the matrix of indices before and after a second intermediate step, subsequent to the first intermediate step, of the method of the invention.

FIG. 10 is the matrix of non-zero terms from FIG. 2, as modified as of a point in time contemporaneous with FIG. 9.

DESCRIPTION OF THE PREFERRED EMBODIMENT

Figure 4:
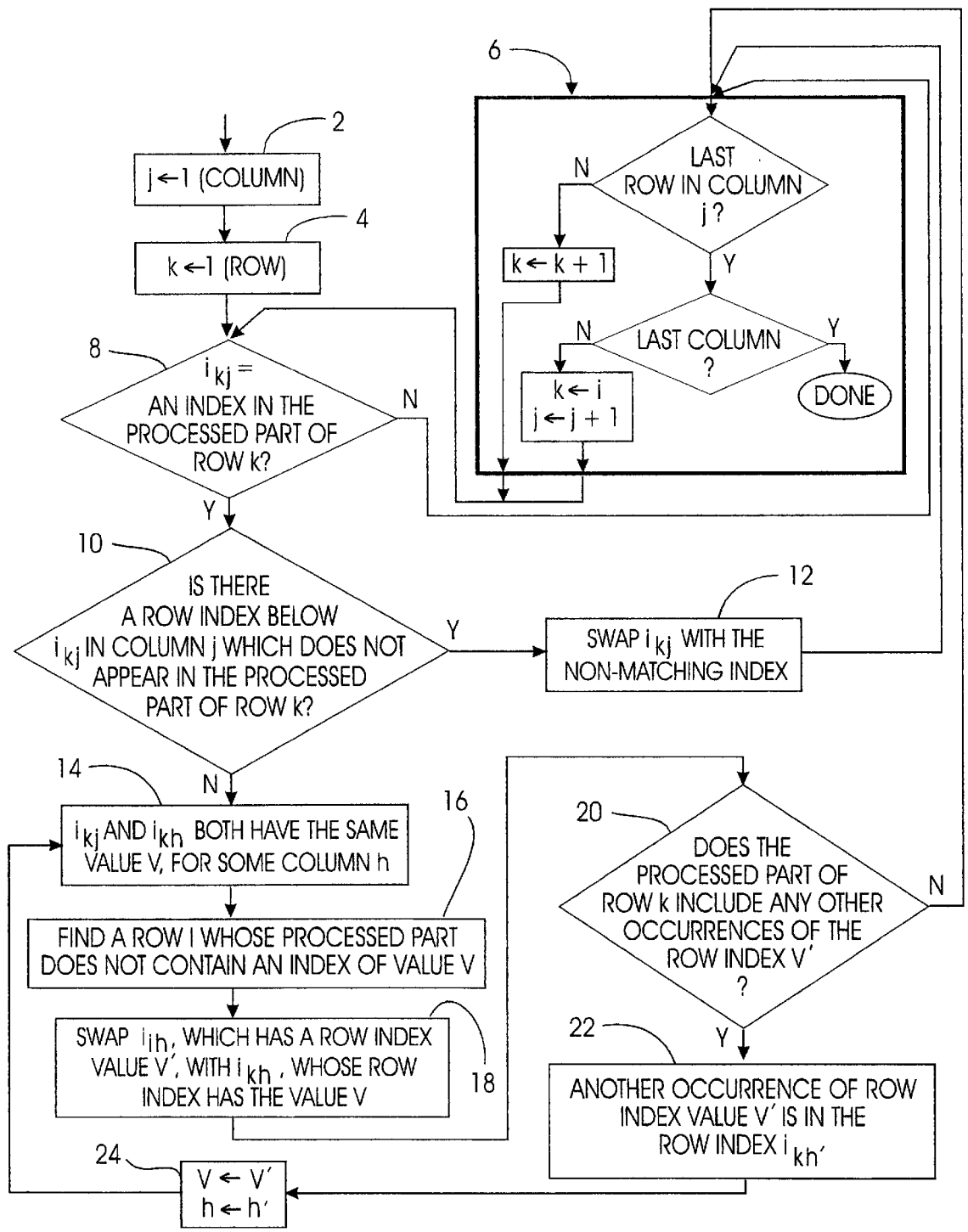
FIG. 4 is a flowchart showing the method in accordance with the invention.

First, the method of the invention will be explained in a general sense through reference to a sparse coefficient matrix (FIG. 1), a block of non-zero terms from the coefficient matrix (FIG. 2), and a corresponding block of indices (FIG. 3). Then, a preferred embodiment of the invention will be discussed in detail.

FIG. 1 is a 10-by-10 matrix of integers, which will be used as an example for describing the invention. While A matrices in real linear programming problems are of the order of thousands-by-thousands in size, 10-by-10 is a convenient size for illustrative purposes. For reference purposes, the columns are numbered 1 through 10 from left to right, and the rows are numbers 1 through 10 from top to bottom (row and column numbers are not shown in FIG. 1). Note that the A matrix of FIG. 1 is relatively sparse, in that only 33 of its 100 terms have non-zero values.

In a typical multiplication on the left pursuant to the simplex method, in which equation (7) is being evaluated, a $\pi^T$ vector of pi values is multiplied by the A matrix of FIG. 1, and all of the product terms are summed. Specifically, the simplex method calculates equation (7) by multiplying each non-zero term of the matrix A by the term of the $\pi^T$ vector of pi values which corresponds with the column in which the A matrix term appeared.

Multiplication involving a sparse matrix involves a large number of zero products produced by, which can be eliminated to improve computational efficiency. To achieve this increased computational efficiency for multiplication on the left, submatrices, or "blocks," are produced which have subsets of the terms of the A matrix. In particular, the A matrix is examined for columns which all have the same number of non-zero terms, and those non-zero terms are blocked together. In this case, columns 1, 3, 5, 6, and 8 each have four non-zero terms. Accordingly, a 4-by-5 block, shown in FIG. 2, is created by grouping the four non-zero terms of each of these five columns.

In order to correctly multiply the appropriate pi values with these non-zero terms, the mapping of $\pi^T$ vector terms with submatrix terms must take into account that the number of A matrix terms in a row of the submatrix is less than the number of terms in the $\lambda^T$ vector. This is done by constructing a companion block, shown in FIG. 3, which has a row and column index for each term in the FIG. 2 submatrix. Each term of the row and column index matrix of FIG. 3 indicates, for a given column of the A matrix, the row and column of the A matrix in which the non-zero term appears. The particular way in which the row and column indices are given for each term of the index block of FIG. 3 may be chosen based on suitability for the particular application. For the discussion which follows, the terms of the index block of FIG. 3 will be referred to generically as index terms, but it will be understood that each index term includes a row index and a column index.

A matrix processor makes use of this data structure, during execution of a $\pi^T A$ (multiplication on the left) calculation in the simplex method, by using an appropriate technique, such as indirect addressing, to determine which pi values are to be read and multiplied by the non-zero terms in the FIG. 2 block, and which pi values can be ignored. In the example given in FIGS. 1–3, the first, third, fifth, sixth, and eighth terms of the $\pi^T$ vector are indirectly addressed, using the indices of FIG. 3, so that the appropriate products of pi values and A matrix terms are computed for use in equation (7). Note that, while the indices of FIG. 3 are both row and column indices, only the column index matters for multiplication on the left, because the same term of the $\pi^T$ vector is multiplied by all of the non-zero terms in the column of the A matrix which corresponds with that $\pi^T$ vector term.

As discussed above, this scheme works well for the simplex method, which performs many multiplications on the left, and relatively few multiplications n the right. For optimization in a computer having matrix processing capability, the blocks of A matrix coefficients and the accompanying blocks of indices for indirect addressing of the pi values should be stored row-wise. As a practical consideration, it is also useful to limit the number of columns in such a block to the length of the vector registers of the particular machine on which the calculation is being run. For instance, if the vector register length were four, then the first four columns of FIGS. 2 and 3 could be set up as one pair of blocks, and the fifth column of FIGS. 2 and 3 would be treated as separate blocks.

Let us now consider how well adapted this scheme is for multiplication on the right. The multiplication on the right used in interior point schemes, Ax, can be converted to a multiplication on the left by taking the transposes of the A matrix and the x vector. That is, Ax is equivalent to $x^T A^T$. However, for vector processing, the terms in a given row of A are stored adjacent to each other, while the terms of a given column need not be so. For $A^T$, however, just the opposite is true: the terms of a given column of A are now in the same row of $A^T$, and therefore should be stored adjacent to each other. The result is that $A^T$ must be stored separately from A. This duplication of the stored terms of the A matrix is an undesirable use of storage space.

The submatrices discussed above in connection with multiplication on the left should be used as well for multiplication on the right, if possible. However, there is a problem. If the row indices in a given row of FIG. 3 are not distinct, the procedure leads to indeterminate (but certainly incorrect) results. However, if the row indices corresponding with each row of the block are distinct, the procedure works.

Therefore, in accordance with the invention, a method is presented for arranging for the indices corresponding with each row of the block to be distinct as often as possible.

The method of the invention is possible because, regardless of the order of the terms within any given column of FIG. 2, the $\pi^T A$ multiplication on the left gives the same result. Therefore, in accordance with the invention, it is possible to rearrange the order of terms in a given column to facilitate the distinctness condition required for the Ax multiplication on the right.

In accordance with the invention, the elements within each column of FIG. 2 are reordered as necessary to maximize the number of rows of the block in FIG. 2 whose row indices in FIG. 3 are distinct. It can be shown that the entries in an s by z block can be re-ordered within each column in such a way that each row of the block has entries whose row indices are distinct if and only if no row entry appears more than s times in the block.

In a preferred embodiment of the invention, the reordering of the terms of the blocks is performed according to an algorithm, given in flowchart form in FIG. 4.

In FIG. 4, the preferred embodiment of the method includes processing the terms of the blocks of coefficient matrix terms and corresponding indices one term at a time. The first term to be processed is the term in the first row and the first column. The remaining terms in the first column are processed, one by one. Then the terms in the next column are processed, and so on, until the terms in the last column are processed.

In FIG. 4, the variables k and j are used to represent the row number and the column number, respectively, of the term being processed. The variables j and k are initialized in steps 2 and 4 of the flowchart. A standard process, which will be readily understood by a skilled programmer, is used for incrementing the row number k through the first column, reinitializing k and incrementing j to the next column, and testing for the end of a column and for the last column. The group of blocks collectively designated 6 shows these steps.

The objective of the flowchart is to ensure that none of the rows of the index array have the same index value occurring more than once. This objective is achievable as long as the number of occurrences of any given index value in the index array is less than or equal to the number of rows of the index array. The essence of the method, then, is to check each index value to see whether it matches any indices already checked in the same row, and, if so, to swap that index with another index, further down the same column, which does not match any indices already checked in the same row. In the detailed discussion which follows, the term "processed part" will be used to refer to the terms within a row, column, or the entire array which have already been checked using the method to be described.

Step 8 is a test, in which it is determined whether $i_{kj}$, the index for the term currently being tested, matches any previously checked indices in that row. That is, it is checked whether there is any $i_{ka}$, where $1 \leq a < j$, which equals $i_{kj}$. If not, the flowchart proceeds to step 6 to move to the next term.

If there is a matching index, then it is necessary to swap that index with another index farther down the same column of the index block, and to swap the corresponding terms of the coefficient block (FIG. 2). However, the index to be swapped into the k-th row/j-th column position of the block must not equal any index in the processed part of the same row.

Thus, step 10 checks the indices $i_{bj}$, where $k<b \leq s$, to find one which does not match any of the indices $i_{kc}$, where $1 \leq c < j$. If step 10 finds such an index, then in step 12, the two indices are swapped. Then, the index being checked is incremented in step 6, and the method moves on to the next index to be checked.

However, it will sometimes be the case that there is no such non-matching index below $i_{kj}$. Then, it becomes necessary to swap, instead, one of the indices $j_{kc}$ elsewhere in the processed part of row k. Step 14 describes such a case, where the current index, $i_{kj}$, has the same value, v, as an already processed index $i_{kh}$ in the same row k. In step 16, the processed part of the array is searched to find a row which does not contain an index of value v. Let us say that row 1 has no indices of value v it is processed part. The index $i_{lh}$, in the same column h as the index $i_{kh}$ has a value v'. Thus, $i_{lh}$ will be swapped with $i_{kh}$. This is done in step 18. After this swap, rows k and h each contain one index of value v.

However, it is possible that row k might contain another index of value v'. If this is the case, a further swap must be made to eliminate this duplication of index values within the same row. Thus, step 20 checks whether any other indices in row k match the value v', which was swapped into row k from row l in step 18. If no other index of value v' is found in the processed part of row k, then the process proceeds to step 6, to move on to the next index.

If another index $i_{kh}$, of value v' is found in the processed part of row k at column h' (step 22), then the method proceeds to step 24. Since essentially the same swapping procedure will be used to separate the two indices of value v' in row k, the flowchart uses steps 14, 16, 18, and 20 as described above. Step 24 facilitates this use of the previously described steps in software, by replacing the value v with v', and by replacing the column of the index to be swapped, column h, with column h'. As long as the number of occurrences of any given index value does not exceed the number of rows in the array, eventually step 20 will test for a situation where the index value swapped into row k does not match any other indices already in row k. Then, the method proceeds to step 6 to move on to the next index in the array.

The method then proceeds until all indices have been checked. The final result is a reordered block of A matrix coefficients and a corresponding block of indices, where, within each row, all of the row indices are distinct.

Consider, as an example, how the method of the invention processes the submatrix of FIG. 2 and the corresponding block of indices given in FIG. 3. FIG. 5 shows an intermediate state in the processing of FIG. 3, in which only the processed part is shown. The top index of the third column, $i_{2,5}$, has the same row index, 2, as the top index of the second column, $i_{2,3}$. Therefore, step 10 finds an index in the third column whose row index is different from any row indices already in the top row. The second index down in the third column is $i_{4,5}$, whose row index, 4, does not match either of the two processed indices in the top row, $i_{3,1}$ and $i_{2,3}$. Therefore, the top two indices in the third column are swapped by step 12. The processed part of the index block now appears as in FIG. 6. Likewise, the A matrix terms are swapped, and FIG. 2 is converted to FIG. 7.

FIG. 8 illustrates the processed part of the index submatrix when the bottom index in the third column, $i_{10,5}$, is being processed. Here, the row index matches that of the bottom index of the second column. However, this time step 10 is unable to find another index below this one, because there aren't any more in the third column. Thus, processing proceeds to step 14, which identifies the bottom index of the second column as having the same row index. Step 16 looks through the second column to find an index whose row index does not appear in the bottom column. The top index of the second column, $i_{2,3}$, satisfies this criterion. Thus, step 18 swaps the top and bottom indices of the second column. The result is as appears in FIG. 9. Also, the corresponding A matrix terms are swapped, and the result is as shown in FIG. 10.

In summary, the method of the invention rearranges indices, and corresponding terms, within the arrays so that multiplication on both the right and on the left can be vector processed. As a consequence, the invention provides advantageously enhances efficiency of memory consumption, and also vector processing efficiency. The method according to the invention can be implemented so as to have a worst case performance of $O(sz^2)$ for blocks of s rows and z columns. In practice, less time than this is generally required for processing the blocks.

Figure 11:
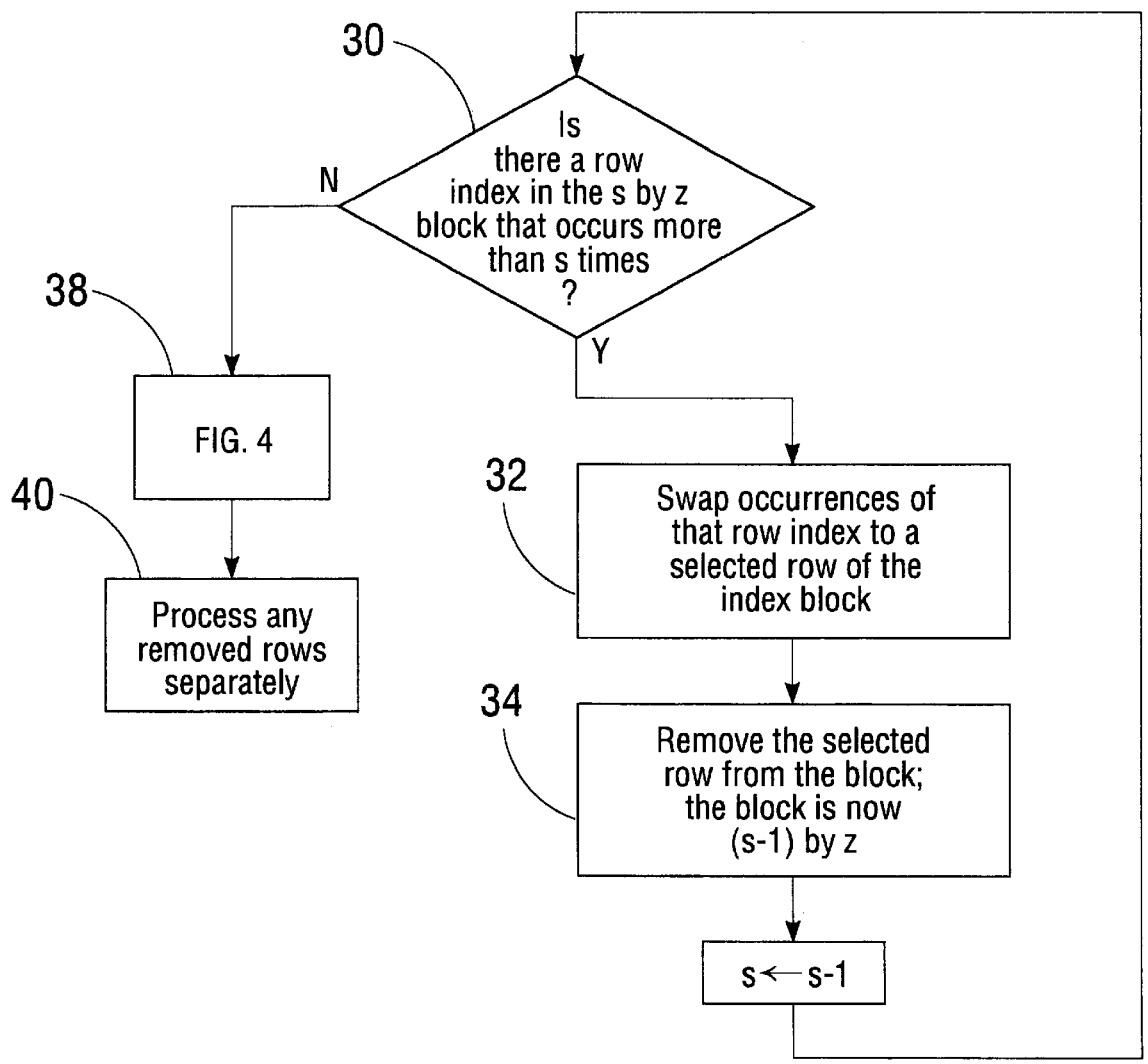
FIG. 11 is a flowchart showing an additional aspect of the method of the invention.
Figure 12:
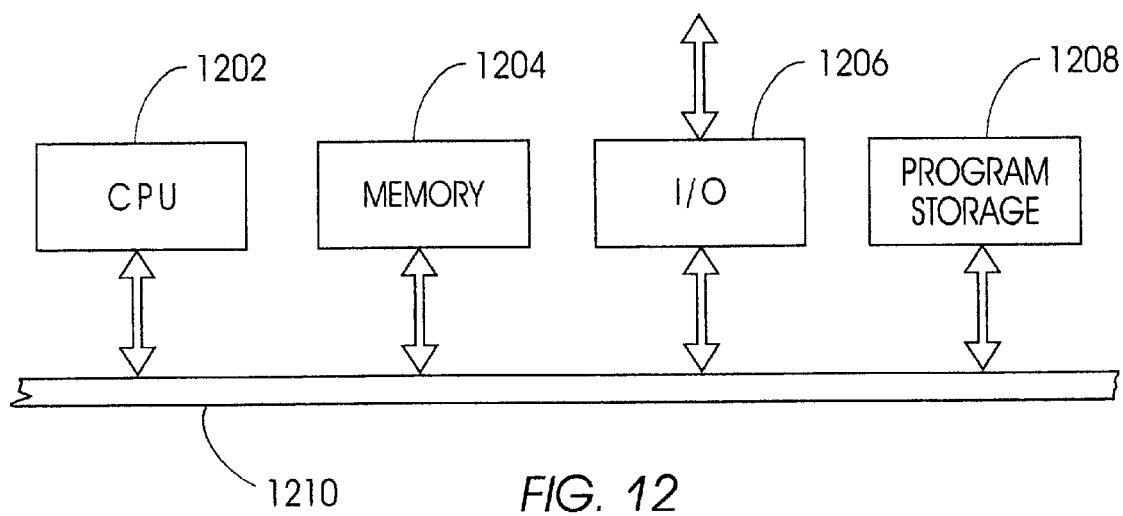
FIG. 12 is a system block diagram of a processing system according to the invention.

It will sometimes be the case that the above conditions are not satisfied, that is, a given row index might occur more than s times for an s by z block. This situation may be dealt with as shown in the flowchart of FIG. 11. When this condition is detected (step 30), occurrences of a frequently occurring row index are swapped to a given row, such as the bottom row, of the block (step 32). That row is then removed from the block (that is, the number of rows is reduced, say, from s to s−1, as shown in step 34). For processing purposes, the value of s may be changed to reflect that the number of rows has been reduced (step 36). If there is now another row index which appears more than s times (s having been reduced in value), the test of step 30 causes the process to be repeated. If and when the block, reduced by removing one or more bottom rows, eventually satisfies the criterion that no row index occurs more frequently than the number of rows remaining in the block, then the vectorized multiplication on the right may take place as shown in FIG. 4 (represented schematically as step 38 in FIG. 11), and the stripped-off row or rows are processed separately (step 40). Of course, the block of A matrix terms (such as FIG. 2) is processed accordingly.

Experimental runs of vectorized calculations using the reordering method of the invention have produced reductions on the processing time for an Ax multiplication on the right up to approximately 50%. The reordering method according to the invention has been found to be fast enough that, even where relatively little improvement in the Ax calculation time has been realized, the improvement more than compensates for the reordering time.

Those skilled in the art will recognize that the foregoing description has been presented for the purposes of illustration and description only. It is not intended to be exhaustive or to limit the invention to the precise forms disclosed, and obviously many modifications and variations are possible in light of the above teachings.

Therefore, the embodiments set forth herein are presented in order to best explain the principles of the present invention and its practical applications to thereby enable others skilled in the art to best utilize the present invention in various embodiments, modifications, and equivalents as are suited to the particular use contemplated.

What is claimed is:

1. A processing system for finding and implementing a cost-effective solution to a logistical problem, the logistical problem including allocating available resources as needed, through the use of a linear programming model of the problem, the system comprising:

a central processing unit;

memory;

input/output;

program storage containing a program executable by the central processing unit, the program including:
means for identifying available quantities of resources;
means for determining need, by quantity, for the resources;

means for modeling the logistical problem as a linear programming problem, including a sparse two-dimensional coefficient matrix of terms whose values include the quantities obtained by the means for identifying and determining;

means for performing matrix calculations, the matrix calculations including matrix multiplications involving the sparse two-dimensional coefficient matrix, the means for performing including:
(a) means for creating a first s-row by z-column submatrix block of non-zero terms from the coefficient matrix, each one of the z columns of the submatrix block including s non-zero terms, all of the terms in a given column of the submatrix block being from a respective column of the coefficient matrix, each one of the non-zero terms having a unique position, identifiable by row and column, within the coefficient matrix,
(b) means for creating a second s-row by z-column submatrix block of row-and-column indices, the indices respectively corresponding with the terms of the first submatrix block and identifying the position of the corresponding term, by row and column, within the coefficient matrix, and
(c) means for reordering terms of the first and second submatrix blocks, within the respective columns, such that the row indices for any given row of the second submatrix block are distinct;

means for repeating operation of the means for performing matrix calculations until the linear programming model has produced a cost-effective solution to the logistical problem; and means for implementing the solution to the logistical problem by allocating the resources to satisfy the needs.

2. A processing system as recited in claim 1, wherein the means for reordering includes:

means for testing the row indices, one by one, to determine whether a row index currently being tested, the row index being currently tested residing within a given row and a given column of the second submatrix block, matches a row index of a previously tested row index within the same row of the second submatrix block;

means, operable when the means for testing detects that a row index being tested matches a row index of a previously tested row index in the same row of the second submatrix block, for checking whether another row index within the given column is distinct from all previously tested row indices within the given row;

means, operable when the means for checking finds another row index within the given column which is distinct from all previously tested row indices within the given row, for swapping the index currently being tested with the index found by the means for checking and for swapping the corresponding terms within the first submatrix block; and means, operable when the means for checking fails to find another row index within the given column which is distinct from all previously tested row indices within the given row, for swapping the previously tested row index having the matching row index value with another index within the column in which the previously tested row index having the matching row index value resides, such that the other index within the column in which the previously tested row index having the matching row index value resides has a row index value which is distinct from all other previously tested row indices within the given row, and for swapping the corresponding terms within the first submatrix block.

3. A processing system as recited in claim 1, wherein the program further comprises:

means for determining whether, within the second submatrix block, there is a row index which occurs more than s times; and means, operable responsive to a determination, by the means for determining, that there is a row index which occurs more than s times, for swapping occurrences of the row index which occurs more than s times to a selected row of the second submatrix block, for swapping the corresponding terms within the first submatrix block, and for removing the selected row from the first and second submatrix blocks;

whereby the removed row is processed separately, and the remainder of the blocks are processed by the means as recited.

4. A system as recited in claim 1, wherein:

the resources to be allocated include goods stored, in various quantities, in various distribution sites;

the means for identifying includes means for identifying the quantities of the goods stored at the distribution sites;

the means for determining need for the goods includes means for determining respective needs, at each of several respective destinations, for the goods;

the system further comprises means for determining costs per units of goods to be transported from each distribution point to each destination; and the means for modeling includes means for incorporating the quantities of the goods at the distribution sites, the need for the goods at the destinations, and the determined costs into the linear programming problem model of the logistical problem.

5. A method for finding and implementing a cost-effective solution to a logistical problem, the logistical problem including allocating available resources as needed, through the use of a linear programming model of the problem, the method comprising the steps of:

identifying available quantities of resources;

determining need, by quantity, for the resources;

modeling the logistical problem as a linear programming problem, including a sparse two-dimensional coefficient matrix of terms whose values include the quantities obtained by the steps of identifying and determining;

performing matrix calculations, the matrix calculations including matrix multiplications involving the sparse two-dimensional coefficient matrix, the step of performing matrix calculations including the steps of:

(a) creating a first s-row by z-column submatrix block of non-zero terms from the coefficient matrix, each one of the z columns of the submatrix block including s non-zero terms, all of the terms in a given column of the submatrix block being from a respective column of the coefficient matrix, each one of the non-zero terms having a unique position, identifiable by row and column, within the coefficient matrix;

(b) creating a second s-row by z-column submatrix block of row-and-column indices, the indices respectively corresponding with the terms of the first submatrix block and identifying the position of the corresponding term, by row and column, within the coefficient matrix; and (c) reordering terms of the first and second submatrix blocks, within the respective columns, such that the row indices for any given row of the second submatrix block are distinct;

repeating the steps of performing matrix calculations until the linear programming model has produced a cost-effective solution to the logistical problem; and implementing the solution to the logistical problem by allocating the resources to satisfy the needs.

6. A method as recited in claim 5, wherein the step of reordering includes the steps of:

testing the row indices, one by one, to determine whether a row index currently being tested, the row index being currently tested residing within a given row and a given column of the second submatrix block, matches a row index of a previously tested row index within the same row of the second submatrix block;

responsive to detection by the step of testing that a row index being tested matches a row index of a previously tested row index in the same row of the second submatrix block, checking whether another row index within the given column is distinct from all previously tested row indices within the given row;

responsive to finding, by the step of checking, another row index within the given column which is distinct from all previously tested row indices within the given row, swapping the index currently being tested with the index found by the step of checking and swapping the corresponding terms within the first submatrix block; and responsive to failure to find, by the step of checking, another row index within the given column which is distinct from all previously tested row indices within the given row, swapping the previously tested row index having the matching row index value with another index within the column in which the previously tested row index having the matching row index value resides, such that the other index within the column in which the previously tested row index having the matching row index value resides has a row index value which is distinct from all other previously tested row indices within the given row, and swapping the corresponding terms within the first submatrix block.

7. A method as recited in claim 5, wherein the step of performing matrix calculations further includes the steps of:

(d) determining whether, within the second submatrix block, there is a row index which occurs more than s times; and (e) responsive to a determination, by the step of determining, that there is a row index which occurs more than s times, (i) swapping occurrences of the row index which occurs more than s times to a selected row of the second submatrix block, (ii) swapping the corresponding terms within the first submatrix block, and (iii) removing the selected row from the first and second submatrix blocks;

whereby the removed row is processed separately, and the remainder of the blocks are processed by the method steps as recited.

8. A method as recited in claim 5, wherein:

the resources to be allocated include goods stored, in various quantities, in various distribution sites;

the step of identifying includes identifying the quantities of the goods stored at the distribution sites;

the step of determining need for the goods includes determining respective needs, at each of several respective destinations, for the goods;

the method further comprises the step of determining costs per units of goods to be transported from each distribution point to each destination; and the step of modeling includes incorporating the quantities of the goods at the distribution sites, the need for the goods at the destinations, and the determined costs into the linear programming problem model of the logistical problem.

9. A computer program product, for use with a processing system for finding and implementing a cost-effective solution to a logistical problem, the logistical problem including allocating available resources as needed, through the use of a linear programming model of the problem, the computer program product comprising:

a recording medium;

means, recorded on the recording medium, for directing the processing system to identify available quantities of resources;

means, recorded on the recording medium, for directing the processing system to determine need, by quantity, for the resources;

means, recorded on the recording medium, for directing the processing system to model the logistical problem as a linear programming problem, including a sparse two-dimensional coefficient matrix of terms whose values include the quantities obtained by the means for identifying and determining;

means, recorded on the recording medium, for directing the processing system to perform matrix calculations, the matrix calculations including matrix multiplications involving the sparse two-dimensional coefficient matrix, the means for directing to perform including:

(a) means, recorded on the recording medium, for directing the processing system to create a first s-row by z-column submatrix block of non-zero terms from the coefficient matrix, each one of the z columns of the submatrix block including s non-zero terms, all of the terms in a given column of the submatrix block being from a respective column of the coefficient matrix, each one of the non-zero terms having a unique position, identifiable by row and column, within the coefficient matrix, (b) means, recorded on the recording medium, for directing the processing system to create a second s-row by z-column submatrix block of row-and-column indices, the indices respectively corresponding with the terms of the first submatrix block and identifying the position of the corresponding term, by row and column, within the coefficient matrix, and (c) means, recorded on the recording medium, for directing the processing system to reorder terms of the first and second submatrix blocks, within the respective columns, such that the row indices for any given row of the second submatrix block are distinct;

means, recorded on the recording medium, for directing the processing system to repeating operation of the means for performing matrix calculations until the linear programming model has produced a cost-effective solution to the logistical problem; and means, recorded on the recording medium, for directing the processing system to implementing the solution to the logistical problem by allocating the resources to satisfy the needs.

10. A computer program product as recited in claim 9, wherein the means for directing to reorder includes:

means, recorded on the recording medium, for directing the processing system to test the row indices, one by one, to determine whether a row index currently being tested, the row index being currently tested residing within a given row and a given column of the second submatrix block, matches a row index of a previously tested row index within the same row of the second submatrix block;

means, recorded on the recording medium, operable when the means for directing to test detects that a row index being tested matches a row index of a previously tested row index in the same row of the second submatrix block, for directing the processing system to check whether another row index within the given column is distinct from all previously tested row indices within the given row;

means, recorded on the recording medium, operable when the means for checking finds another row index within the given column which is distinct from all previously tested row indices within the given row, for directing the processing system to swap the index currently being tested with the index found by the means for directing to check, and for directing the processing system to swap the corresponding terms within the first submatrix block; and means, recorded on the recording medium, operable when the means for checking fails to find another row index within the given column which is distinct from all previously tested row indices within the given row, for directing the processing system to swap the previously tested row index having the matching row index value with another index within the column in which the previously tested row index having the matching row index value resides, such that the other index within the column in which the previously tested row index having the matching row index value resides has a row index value which is distinct from all other previously tested row indices within the given row, and for directing the processing system to swap the corresponding terms within the first submatrix block.

11. A computer program product as recited in claim 9, further comprising:

means, recorded on the recording medium, for directing the processing system to determine whether, within the second submatrix block, there is a row index which occurs more than s times; and means, recorded on the recording medium, operable responsive to a determination, by the means for directing to determine, that there is a row index which occurs more than s times, for directing the processing system to swap occurrences of the row index which occurs more than s times to a selected row of the second submatrix block, for directing the processing system to swap the corresponding terms within the first submatrix block, and for directing the processing system to remove the selected row from the first and second submatrix blocks;

whereby the removed row is processed separately, and the remainder of the blocks are processed by the means as recited.

12. A computer program product as recited in claim 9, wherein:

the resources to be allocated include goods stored, in various quantities, in various distribution sites;

the means for directing to identify includes means, recorded on the recording medium, for directing the processing system to identify the quantities of the goods stored at the distribution sites;

the means for directing to determine need for the goods includes means, recorded on the recording medium, for directing the processing system to determine respective needs, at each of several respective destinations, for the goods;

the computer program product further comprises means, recorded on the recording medium, for directing the processing system to determine costs per units of goods to be transported from each distribution point to each destination; and the means for directing to model includes means, recorded on the recording medium, for directing the processing system to incorporate the quantities of the goods at the distribution sites, the need for the goods at the destinations, and the determined costs into the linear programming problem model of the logistical problem.

* * * * *